United States Patent [19]

West et al.

[11] Patent Number: 4,669,941

[45] Date of Patent: Jun. 2, 1987

[54] GRAIN AUGER SYSTEM

[75] Inventors: Robert A. West, Vulcan; Glenn R. Ager, Nanton, both of Canada

[73] Assignee: Ar-Man Construction, Ltd., Ala.BERTA, Canada

[21] Appl. No.: 734,648

[22] Filed: May 16, 1985

[30] Foreign Application Priority Data

Dec. 14, 1984 [CA] Canada .................................. 470245

[51] Int. Cl.⁴ ............................................. B65G 33/32
[52] U.S. Cl. ................................... 414/310; 414/326; 414/523; 198/518; 248/278
[58] Field of Search ............... 414/310, 311, 312, 329, 414/320, 321, 326, 305, 306, 307, 309, 304, 313, 314, 315, 316, 318, 323, 325, 327, 133, 308, 322; 198/518; 248/278

[56] References Cited

U.S. PATENT DOCUMENTS

| | | | |
|---|---|---|---|
| 2,790,563 | 4/1957 | McCarthy | 414/312 |
| 2,801,885 | 8/1957 | Harris | 414/322 X |
| 3,076,567 | 2/1963 | O'Dell | 414/310 |
| 3,134,491 | 5/1964 | Glenn et al. | 414/310 |
| 3,151,749 | 10/1964 | Long | 414/310 |
| 3,367,519 | 2/1968 | Ferris et al. | 414/310 |
| 3,543,948 | 12/1970 | Tatum | 414/326 |
| 3,647,094 | 3/1972 | Jackson | 414/310 X |
| 3,742,209 | 6/1973 | Williams | 248/278 X |
| 4,447,170 | 5/1984 | Holmes | 248/278 X |

FOREIGN PATENT DOCUMENTS

| | | |
|---|---|---|
| 473933 | 11/1949 | Canada . |
| 497373 | 11/1953 | Canada . |
| 506574 | 10/1954 | Canada . |
| 982321 | 1/1976 | Canada . |
| 1005613 | 2/1977 | Canada . |
| 1048727 | 2/1979 | Canada . |
| 1061274 | 8/1979 | Canada . |
| 1071373 | 2/1980 | Canada . |
| 1131231 | 10/1968 | United Kingdom ................ 414/310 |

Primary Examiner—Frank E. Werner
Attorney, Agent, or Firm—Jones, Tullar & Cooper

[57] ABSTRACT

A floor sweep auger system for mounting in an existing grain bin of the type having a wood or concrete floor and a cylindrical wall. A stationary auger is mounted with an inner intake end secured to the floor at the center of the bin and an outer discharge end extending through the wall of the bin at a location above the floor. A moveable auger, which has a length substantially equal to the radius of the bin, is mounted for sweeping an arc of approximately 360°. A center mounting coupling of the moveable auger, which has a fixed pivot axis and a moveable pivot axis, allows the moveable auger to start from a position parallel to and adjacent one side of the stationary auger and to swing through the arc to a terminal position parallel to and adjacent the opposite side of the stationary auger. The system is particularly designed for use in existing grain bins without requiring any modification to the floor and yet will allow a pick-up of substantially all of the grain in the bin without any manual movement of the grain.

8 Claims, 6 Drawing Figures

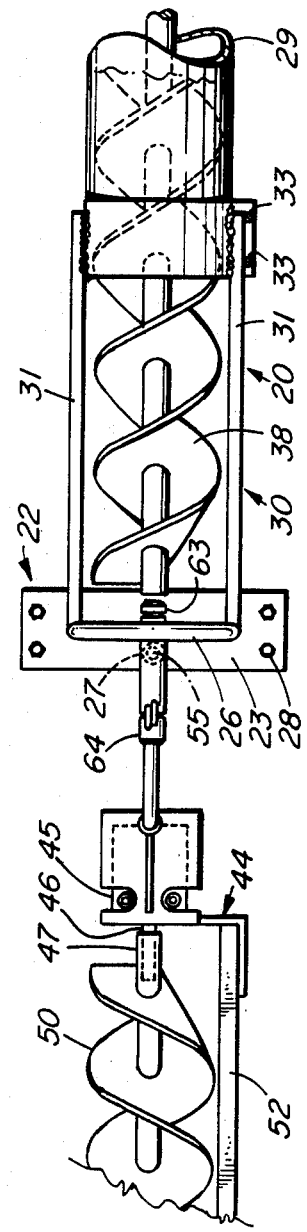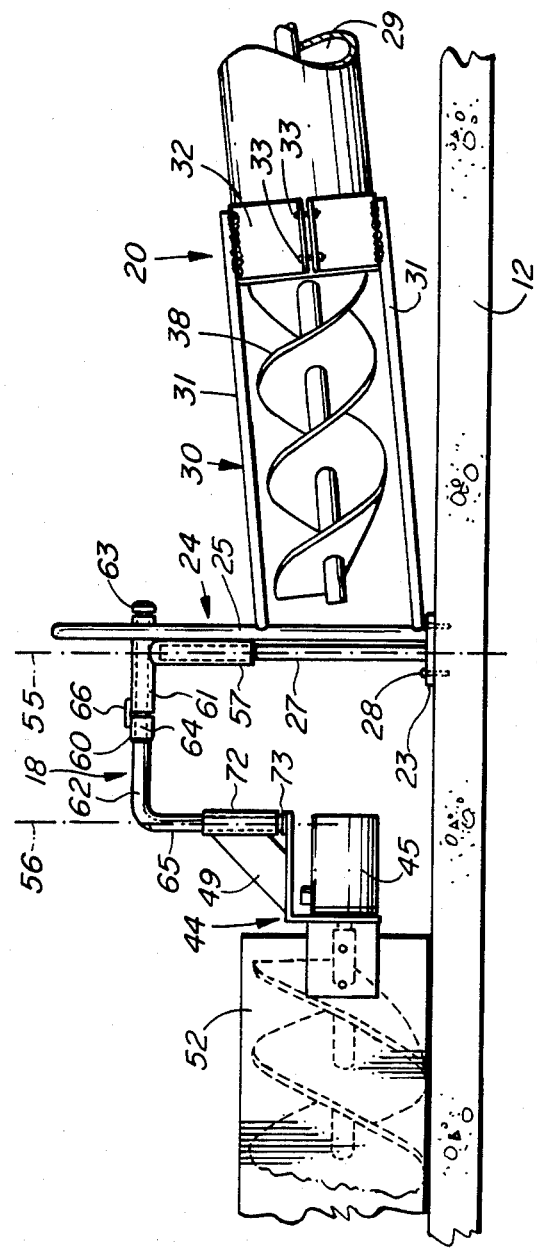

GRAIN AUGER SYSTEM

BACKGROUND OF THE INVENTION

1. Field of the Invention

This invention relates to a floor sweep auger system for use in circular grain bins which have been previously built, and more particularly to a coupling which permits an unique sweeping motion of a moveable auger to cover substantially the entire floor area in the grain bin.

2. Description of the Prior Art

For many years, granaries of the circular type, i.e. those with a cylindrical wall, have been built. Some of the existing granaries have wood floors, but most have poured concrete floors. A common manner of unloading these granaries involved the pushing of the intake end of portable grain augers in through a door to thereby draw a major portion of the grain out through the auger. The handling of the auger is difficult and because a substantial amount of the grain cannot be picked up by the auger, this method of unloading involves considerable manual labour in cleaning out the granary, which manual labour is unpleasant because of dusty conditions. Another method involves the use of trucks equipped with suction type tubes which are inserted into the granary, but again, the pick up of the final store of grain in the bin involves the manual manipulation of the pick up tubes within the granary. In granaries which are now being constructed, it is common to build an auger mechanism into the floor for drawing the grain from a central intake in the bin to the outside. A moveable auger can be mounted on the granary floor for travel about a central anchor point for drawing the grain to the central intake. It is extremely expensive, however, to modify existing floors in granaries for this type of in floor system.

BRIEF SUMMARY OF THE INVENTION

It is an object of the present invention to provide an economical system which can be readily mounted on a floor in an existing granary for conducting a complete sweep of the floor without the need of a person being within the granary when the system is in operation.

According to one aspect of the present invention, there is provided a coupling for permitting travel of a sweep auger about a fixed point, the coupling having a stationary anchor member for securement at the fixed point. A rotary member is mountable on the anchor member for rotation relative to the anchor member about a substantially vertical axis, and an arm member has means connecting the arm member to the rotary member and permitting rotation of an outer end thereof relative to the rotary member about a substantially horizontal axis. A connector member is provided for connection to the inner end of the auger and the connector member has means for fastening the connector member to the outer end of the arm member and permitting rotation of the connector member relative to the outer end of the arm member about an axis in a plane substantially normal to said horizontal axis.

Another aspect of the invention, resides in the provision of a floor sweep auger system for installation in a grain bin having a floor and a cylindrical wall. The system includes a stationary auger having an auger tube with an inlet end for fastening to the bin floor at substantially the centre of the bin and an outlet end for projecting outwardly through the wall. The system also includes a moveable auger having a length substantially equal to but less than the radius of the bin, and a pivot coupling means connecting an inner end of the movable auger adjacent the inner end of the stationary auger and permitting travel of the moveable auger through a sweep of approximately 360°.

Accordingly, the moveable auger can start in an initial position where it is parallel to and immediately adjacent one side of the stationary auger and swing through an arc of substantially 360°, with the inner or discharge end of the moveable auger remaining adjacent the intake of the stationary auger, until the moveable auger reaches a terminal position parallel to and immediately adjacent the other side of the stationary auger.

BRIEF DESCRIPTION OF THE DRAWINGS

Other advantages and features of the invention will become apparent from the following description of an example of the invention which is illustrated in the accompanying drawings, wherein:

FIG. 3 is an enlarged side view of the coupling of the invention operatively connected to the inner end of the moveable auger;

FIG. 4 is a top view of the coupling shown in FIG. 3;

DESCRIPTION OF THE PREFERRED EMBODIMENT

Figure 2:
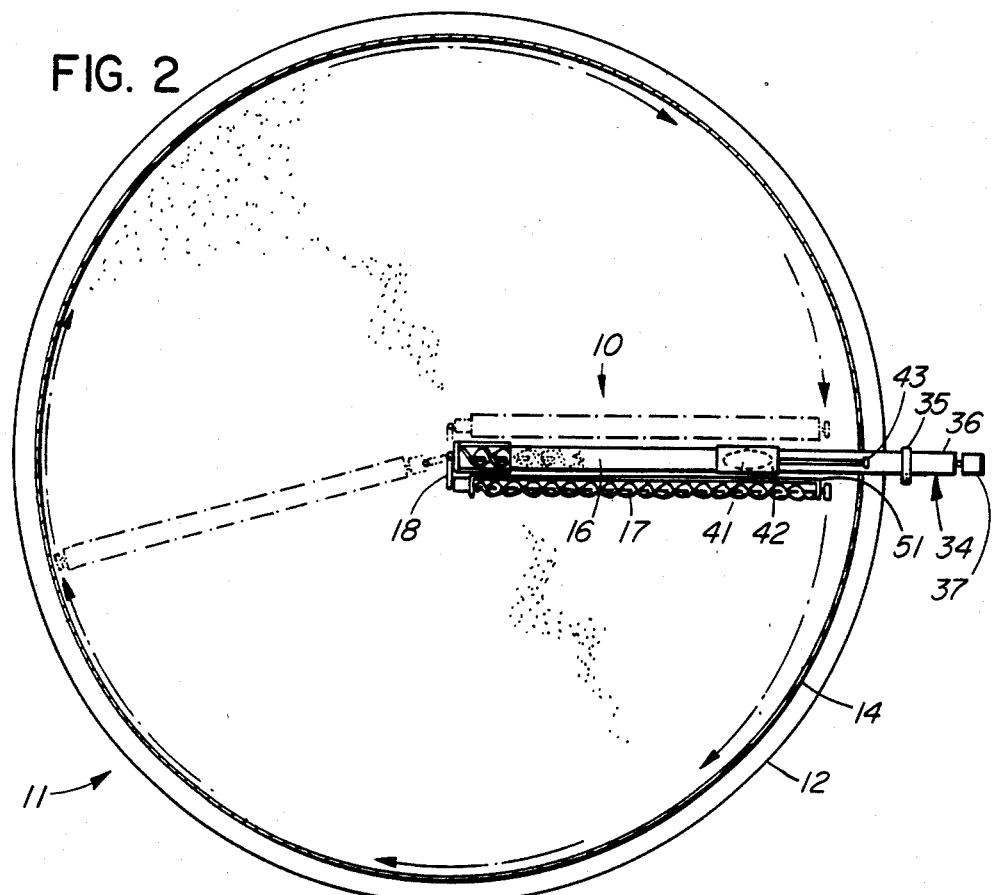
FIG. 2 is a plan view of the system shown in FIG. 1 but with the moveable auger in a starting position.
Figure 1:
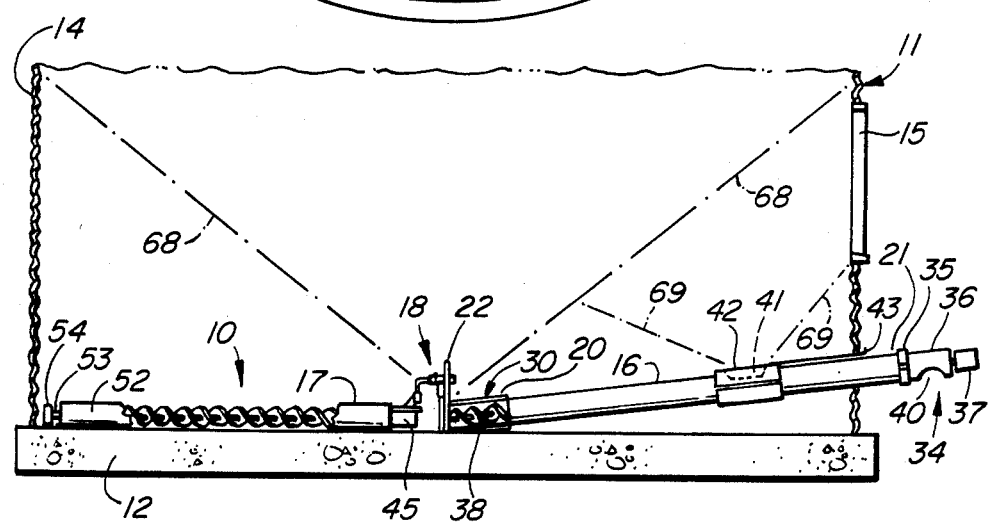
FIG. 1 is a partial sectional view showing a grain bin having the system of the present invention mounted therein.

In FIGS. 1 and 2, the reference number 10 generally denotes the floor auger sweep system of the present invention. The system 10 is shown installed in a granary bin 11 including a permanent concrete floor 12 and a cylindrical wall 14 having a door 15 (FIG. 1), and the system includes a stationary auger 16 and a moveable auger 17 the inner end of which is held by a novel coupling 18 of the present invention. The stationary auger 16 has its inner end 20 fastened to the floor 12 at the centre point of the bin 11 with an outer end 21 thereof projecting out through the wall 14 of the bin at a point above the floor 12 so that the stationary auger 16 has a slight incline. As illustrated in FIG. 1, the location of the opening provided in wall 14 for the stationary auger 16 is preferably below the opening of door 15 for reasons which will become apparent from the following description. Also as will become more apparent in the following description the length of the moveable auger is slightly less than the radius of the cylindrical wall 14.

The stationary auger 16 has its inner end fastened to the floor 12 by an anchor structure 22 which has a foot or base plate 23 (FIGS. 3 and 4) to which it is secured, such as by welding and, an inverted U-shaped member 24 consisting of a pair of parallel legs 25,25 joined at the upper end by a transverse member 26. Also secured to the foot plate 23 is an upward extending shaft 27 which is spaced to one side of a line joining the legs 25,25 by a short distance (FIG. 3). The anchor structure 22 may be secured to the floor 12 by lag screws 28.

The stationary auger 16 has a tube section 29 which extends from a cage 30 at its lower end to an outer end which extends a short distance to the outside of wall 14. The cage 30 includes two pairs of bars 31, each pair being welded to one of the legs 25 of the anchor structure 22 with the outer end of the rods being welded to a clamp collar 32 which tightens onto the lower end of tube section 29 by screws 33. A power head 34 unit is detatchably connected to the tube section by way of a connector clamp 35. The power head unit 34 includes a short tube section 36 on the outer end of which is connected a drive motor 37 which is preferably in the form of a rotary hydraulic unit having its drive shaft connected to the outer end of a spiral auger 38. The auger 38 extends a sufficient distance from the end of the tube section 36 so that when the tube section 36 is brought into engagement with the outer end of tube section 29, the auger 38 extends through the tube section 29 and into the cage 30. The tube section 36 is provided with discharge opening 40 which is positioned a height sufficiently above the ground to permit discharge into a loading auger (not shown) for conveying the grain up to a grain wagon or truck. The cage 30, which exposes the inner end of auger 38, provides the main inlet for the stationary auger at the centre of the granary bin, but tube section 29 has a secondary inlet 41 on a top surface thereof between the cage 30 and the cylindrical wall 14. Secondary inlet 41 is normally covered by a sliding gate or cover 42 which has affixed thereto a handle 43 extending to the exterior of wall 14 so that the cover 42 may be pulled manually from a closed to an open position from the outside of the granary.

The moveable auger 17 includes an end bracket 44 at an inner end thereof, the bracket 44 mounting a second drive motor 45, which again is preferably a rotary hydraulic motor having an output shaft 46 extending through the bracket and drivingly connected to an inner end shaft 47 of spiral auger 50. A sweep backboard 52, which is oriented in a vertical plane, extends from bracket 44 to an outer end bracket 51 (FIG. 2). An outer end shaft 53 extends through bracket 51, and a tracking wheel 54 is mounted on shaft 53 for rotation with spiral auger 50.

Figure 5:
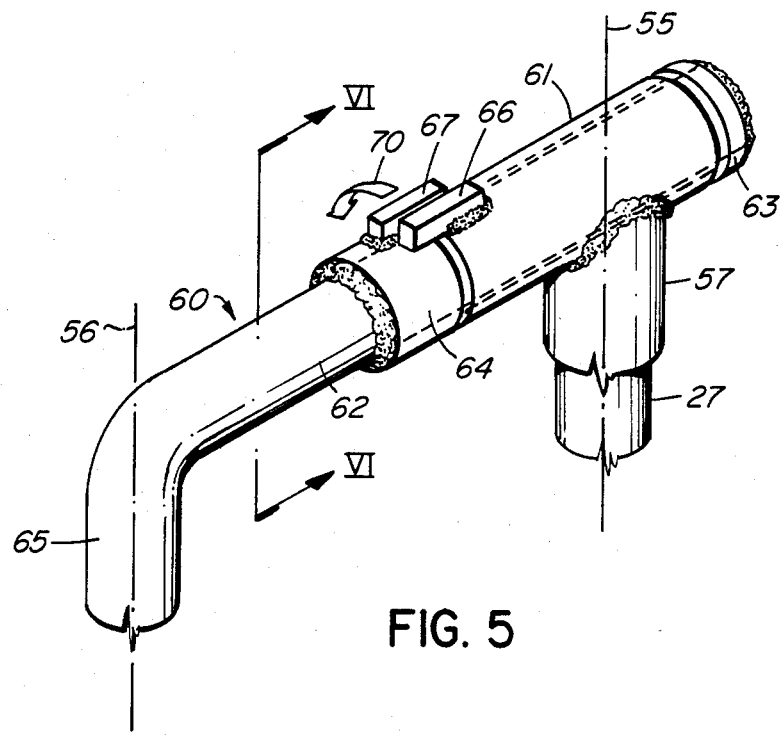
FIG. 5 is an enlarged perspective view of a portion of the coupling shown in FIG. 3.
Figure 6:
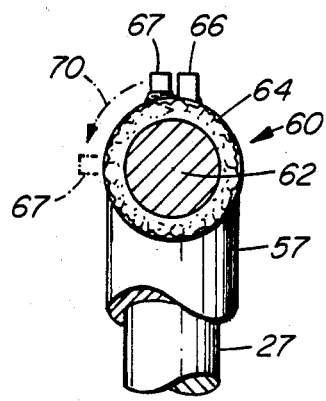
FIG. 6 is a cross-section view as seen from the line V1—V1 of FIG. 5.

The coupling 18 provides for pivoting of the inner end of moveable auger 17 about the inner end of stationary auger 16, the pivoting taking place about a stationary vertical axis 55, as well as a moveable vertical axis 56, FIG. 3, so that the moveable auger 17 can sweep through substantially 360° from an initial position parallel to and immediately adjacent one side of the stationary auger 16, as shown in full lines in FIG. 2, to a terminal position immediately adjacent the opposite side of stationary auger 16, as shown in one of the chain dotted outlines in FIG. 2. The anchor structure 22 is secured to the floor 12 with the vertical shaft 27 on the central axis of the cylindrical wall 14, the shaft 27 providing the fixed or stationary vertical axis of pivot of the coupling 18. The coupling 18 includes a rotary member in the form of a sleeve 57 which receives the upper end of shaft 27 and is free to rotate thereon. A horizontal arm 60 is connected to the upper end of the sleeve 57, the arm 60 including a horizontally disposed sleeve 61 which is perpendicular to sleeve 57 and is affixed thereto, such as by welding. The arm 60 further includes a shaft 62 which is journalled in sleeve 61 but is restricted against axial movement relative to sleeve 61 by collars 63 and 64 which are fixed to shaft 62, such as by welding. The outer end of shaft 62 has an end portion 65 which is turned at a right angle relative to the main or horizontal portion of shaft 62. The end portion 65 is therefore disposed in a plane which is normal to the horizontal arm 60, the end portion 65 being usually in a vertical orientation so as to provide the moveable vertical axis 56 which is disposed parallel to fixed vertical axis 55 (FIG. 5). Welded to the top of horizontal sleeve 61 is a piece of square bar stock 66 which extends axially outward from the end of sleeve 61 so as to overlie collar 64 which is fixed to shaft 62. A second piece of bar stock 67 is welded to collar 64 and extends in an axial direction to overlie sleeve 61. When the end portion is depending from shaft 62 in a vertical position the two pieces of bar stock are in engagement so as to prevent end portion 65 from rotating further in the clockwise direction as viewed in FIG. 5. The shaft 62 can rotate in the counterclockwise direction as indicated by arrows 70 in FIGS. 5 and 6. A sleeve 72 receives the lower end of end portion 65 and is free to rotate thereon. An enlarged head 73 at the lower end of end portion 65 prevents the sleeve 72 from sliding axially off the end of end portion 65. Sleeve 72 is fixed to bracket 44 by a web 49. Thus, the sleeve 72 and bracket 44 in combination with end portion 65 provide the pivot axis 56.

In the system of the present invention, only the anchor structure 22, the cage 30 which is permanently connected to the anchor structure, and tube section 29 remain in a bin when it is filled, with a cap being preferably clamped to the outer end of the tube section 29 so as to close it off from the exterior. Thus when setting up the system of this invention, it would be customary for the owner of a number of grain storage bins to obtain a set of the above described permanently attached components, one for each granary. It would be necessary to purchase only one power head unit 34, one moveable auger 17 and one coupling 18 which is permanently connected to the moveable auger.

When a bin is to be emptied, the power head unit is installed by pushing the spiral auger 38 into the tube section 29 and clamping the tube section 36 to the outer end of tube section 29 by way of connector clamp 35. The motor 37 is then connected to the hydraulic system of a tractor via the appropriate control valves. As the motor 37 is operated, the grain is augered from the centre of the bin and discharged through opening 40 and is thus loaded into a wagon or truck by way of a portable loading auger (not shown). The bin continues to empty until the remaining grain forms a sloping annular section around the outside of the bin as denoted by lines 68. At this point, it is not possible to auger additional grain from the bin by way of stationary auger 16 through the cage 30. Therefore, cover 42 is then moved by pulling the handle 43 to uncover secondary inlet 41 so that the grain in between door 15 and the anchor structure is lowered to that which is indicated by dash lines 69. The operator of the system can then push the inner end of the moveable conveyor 17 through the door opening and towards the anchor structure 22. The sleeve 57 of the coupling 18 is pushed down over the upwardly extending shaft 27. The horizontal arm 60 is turned at right angles to the stationary auger 16 so that it engages one leg 25 of the anchor structure 22, the leg 25 acting as a stop. Because the moveable auger 17 is then disposed in a plane parallel to and adjacent one side of the stationary auger 16, the horizontal arm 60 is also at right angles to the moveable auger 17, and it can be seen that the arm 60 need only be slightly longer than one half the sum of the diameters of the stationary and moveable augers. Because the grain level in the area of the stationary auger is still well above the floor at this stage, the moveable auger lying on top of the grain is on an incline with the outer end being raised. This orientation is permitted by end portion 65 turning at an angle relative to vertical shaft 27, this turning being accomplished by horizontal shaft 62 turning in sleeve 61 in the direction of arrow 70, i.e. stop 67 moves away from stop 66.

When the moveable auger 17 has been installed as described above, the hydraulic motor 45 is also hooked up to the hydraulic system of a tractor by way of hydraulic hoses (not shown), and then both motors 37 and 45 are activated. As spiral auger 50 starts turning it immediately pushes the grain still remaining thereunder towards its inner end where it enters cage 30 and is delivered through stationary auger 16 to the discharge opening 40. Thus, the moveable auger 17 is lowered to the floor, and due to the auger action and the turning action of wheel 54, the moveable auger 17 pushes in a clockwise direction as seen in FIG. 2. Because the wheel 54 turns at a speed faster than it can propel the auger, it simply spins but helps maintain the moveable auger against the large embankment of grain in front of it. The grain in the embankment is continually moved towards the inner end of the moveable auger, i.e. the centre of the granary where it enters stationary auger 16. The sweep backboard engages the floor and prevents the grain from spilling out behind the auger. As the auger 17 is lowered to the floor the shaft 62 turns clockwise relative to sleeve 61 (FIG. 5), but once the auger 17 reaches the floor and commences movement in a clockwise direction (FIG. 2) the stops 66 and 67 are engaged and thus provide a reactionary force to the turning auger so as to prevent the blackboard from being turned under the spiral auger 50. As the moveable auger commences its sweep in the clockwise direction (FIG. 2) it pivots about the moveable pivot axis 56 of the coupling 18 for approximately the first 90° at which time the moveable auger is aligned with the horizontal arm 60. Because of the outward radial pull due to the auger action, the auger and arm 60 remains aligned as the arm 60 leaves the leg 25 and the moveable auger then pivots about fixed vertical axis 55 formed by shaft 27 for the following 180° degrees. It can be seen that if the length of moveable auger 17 plus the length of the horizontal arm 60 is only slightly less than the radius of the cylindrical wall 14 and vertical shaft 27 of anchor structure 22 is located at the center of the bin, the outer end of the moveable auger travels for about 180° immediately adjacent the inner surface of the bin wall. After travelling the 180° degrees, the arm 60 engages the other leg 25 of the U-shaped member at which time the moveable auger again commences to pivot about the axis 56 and continues to do so for approximately 90° until the moveable auger 17 reaches its terminal position adjacent the stationary auger 16 as indicated in dashed line. The moveable auger 17 therefore sweeps substantially the entire floor area within the cylindrical wall 14, the only portion not being traversed by the moveable auger being a crescent shaped portion formed at the outer end of the auger during its first 90° and last 90° movement, the width of the crescent at its maximum thickness being only slightly greater than the length of the horizontal arm 60.

From the above, it can be seen that a system is provided which permits an almost complete sweep of a circular granary with no modification to the floor structure, it only being necessary to fasten anchor structure 22 to the centre of the bin. Moreover, it is not necessary when the system is in use for an operator, to enter the bin. The cost of utilizing the system in a large number of bins is not excessive because the more expensive components of the system can be moved from bin to bin.

Various modifications to the embodiment which has been illustrated as an example will be obvious to those skilled in the art without departing from the spirit of the invention as defined in the appending claims.

I claim:

1. A floor sweep auger having a relatively flat floor and a cylindrical outer wall, said system comprising:

a stationary auger including an outer auger tube having an inlet end and an exterior end, anchor means for permanently fixing said inlet end on said floor at substantially the center point of the cylindrical wall, with the exterior end of the auger tube extending outwardly through the wall at a location above the floor; a removable powerhead attachable to the exterior end of said auger tube, said powerhead including motor means drivingly connected to a spiral auger member for reception throughout the length of the auger tube;

a movable sweep auger having an inner discharge end and a length substantially equal to but less than the radius of the cylindrical wall; and pivot coupling means for pivotally connecting said inner end of the sweep auger to the floor, said coupling means having a primary pivot means permitting pivotal movement of said coupling means about a first vertical axis at the center point of said cylindrical wall, said primary pivot means including a rotary member detachably mountable relative to said anchor means, and a secondary pivot means for permitting pivoting of the inner end of said sweep auger about a second vertical axis spaced from said first vertical axis to allow the sweep auger to pivot through a sweep arc of approximately 360° between positions immediately adjacent opposite sides of the stationary auger, said coupling means further including an arm member having means connecting said arm member to said rotary member, and a connector member having means secured to the inner end of the sweep auger and pivotally connected to an outer end of said arm member for providing the second vertical axis, said means connecting said arm member to said rotary member including means permitting rotation of the outer end of said arm member about a substantially horizontal axis whereby said sweep auger can swing upward in a vertical plane when said sweep auger is in the initial position adjacent said stationary auger.

2. A system as defined in claim 1, wherein said movable auger includes a bracket fixed to said connector member, a motor mounted on said bracket, an elongated spiral auger member having an inner end shaft journalled in said bracket, said motor having an output shaft drivingly connected to said end shaft.

3. A system as defined in claim 1, wherein said stationary auger further includes an open cage providing the inlet to said stationary auger, said cage being coaxial with and extending inwardly beyond the inlet end of said tube, said anchor means permanently connecting an inner end of said cage to the floor of said bin.

4. A system as defined in claim 3, wherein said tube is provided with a secondary inlet at a location disposed between said cage and the outer wall of the bin, and further including cover means for said secondary inlet being movable between an open position and a closed position, and a manually operable handle extending externally of said bin wall for moving said cover to the open position.

5. A system as defined in claim 3, wherein said removable powerhead includes an extension tube coaxially attachable to the exterior end of said auger tube, said motor being mounted on said extension tube, said extension tube having therein a discharge opening of said stationary auger.

6. A system as defined in claim 5, wherein said spiral auger member extends from said inner end of said extension tube a distance sufficient to have an inner end thereof located in said cage as said extension tube is brought into engagement with the outer end of said outer auger tube.

7. A floor sweep auger system for installation in a grain bin having a relatively flat floor and a cylindrical outer wall, said system comprising:
- a stationary outer auger tube having an inlet end and an exterior end;
- anchor means for permanently fixing said inlet end on the floor at substantially the center point of the cylindrical wall, with the exterior end of said auger tube extending outwardly through the wall at a location above the floor;
- a removable powerhead attachable to the exterior end of said auger tube, said powerhead including motor means drivingly connected to a spiral augur member for reception throughout the length of said auger tube;
- a movable sweep auger having an inner discharge end and a length substantially equal to but less than the radius of the cylindrical wall; and
- coupling means for pivotally connecting said inner end of said sweep auger to the floor, said coupling means having a first pivot means detachably mountable on said anchor means permitting pivotal movement of said coupling means about a first vertical axis at the center point of the cylindrical wall, secondary pivot means connected to said inner end of said sween auger for permitting pivoting of the inner end of said sweep auger about a second vertical axis spaced from said first vertical axis, and means interconnecting said first and second pivot means for providing vertical motion in said sweep auger so that said auger is movable in vertical and horizontal planes as it pivots through a sweep arc of approximately 360° between positions immediately adjacent opposite sides of the stationary auger.

8. A system as defined in claim 7 wherein said secondary pivot means comprises a connector member secured to the inner end of the sweep auger and pivotally connected to an outer end of said interconnecting means for providing said second vertical axis, said interconnecting means including shaft means permitting rotation of the outer end of said interconnecting means about a substantially horizontal axis whereby said sweep auger can swing upwardly in a vertical plane.

* * * * *